United States Patent
Tsukamoto et al.

(10) Patent No.: US 9,614,233 B2
(45) Date of Patent: *Apr. 4, 2017

(54) FUEL CELL MODULE

(71) Applicant: HONDA MOTOR CO., LTD., Tokyo (JP)

(72) Inventors: Keiji Tsukamoto, Wako (JP); Shigeru Toda, Kiryu (JP); Hiroki Homma, Asaka (JP); Hideichi Yamamura, Tokorozawa (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,208

(22) Filed: Aug. 27, 2015

(65) Prior Publication Data

US 2016/0064747 A1    Mar. 3, 2016

(30) Foreign Application Priority Data

Aug. 29, 2014 (JP) ................ 2014-175612

(51) Int. Cl.
| | | |
|---|---|---|
| H01M 8/04 | (2016.01) | |
| H01M 8/06 | (2016.01) | |
| H01M 8/04014 | (2016.01) | |
| H01M 8/0662 | (2016.01) | |
| H01M 8/0612 | (2016.01) | |
| H01M 8/04089 | (2016.01) | |
| H01M 8/124 | (2016.01) | |
| H01M 8/2475 | (2016.01) | |

(52) U.S. Cl.
CPC ... *H01M 8/04022* (2013.01); *H01M 8/04097* (2013.01); *H01M 8/0618* (2013.01); *H01M 8/0675* (2013.01); *H01M 8/2475* (2013.01); *H01M 2008/1293* (2013.01)

(58) Field of Classification Search
CPC ......... H01M 8/04022; H01M 8/04097; H01M 8/0675; H01M 8/0618; H01M 8/2475
See application file for complete search history.

(56) References Cited

U.S. PATENT DOCUMENTS

| | | |
|---|---|---|
| 3,150,657 A | 9/1964 | Shultz, Jr., et al. |
| 6,042,956 A | 3/2000 | Lenel |
| 2012/0040256 A1 | 2/2012 | Kani et al. |

(Continued)

FOREIGN PATENT DOCUMENTS

| | | |
|---|---|---|
| EP | 0 456 848 A1 | 11/1991 |
| EP | 0 818 840 A1 | 7/1996 |

(Continued)

OTHER PUBLICATIONS

This case is co-pending with U.S. Appl. No. 14/837,198, filed Aug. 27, 2015.

(Continued)

*Primary Examiner* — Stewart Fraser
(74) *Attorney, Agent, or Firm* — Rankin, Hill & Clark LLP

(57) ABSTRACT

A fuel cell module includes a first casing containing the fuel cell stack, and a second casing containing the first casing, an exhaust gas combustor, and a heat exchanger. The exhaust gas combustor has a combustion gas discharge opening opened to a combustion gas chamber formed between the first casing and the second casing.

7 Claims, 7 Drawing Sheets

(56) References Cited

U.S. PATENT DOCUMENTS

| | | | | |
|---|---|---|---|---|
| 2015/0180055 A1* | 6/2015 | Nakata | ............. | H01M 8/04014 |
| | | | | 429/410 |
| 2015/0311553 A1* | 10/2015 | Dohkoshi | ........... | H01M 8/0631 |
| | | | | 429/410 |
| 2016/0064761 A1* | 3/2016 | Tsukamoto | ....... | H01M 8/04097 |
| | | | | 429/415 |

FOREIGN PATENT DOCUMENTS

| EP | 1 855 342 A2 | 11/2007 |
|---|---|---|
| EP | 2 075 226 A2 | 7/2009 |
| JP | 2012-182032 | 9/2012 |
| JP | 2013-101822 | 5/2013 |
| JP | 2013-225411 | 10/2013 |
| WO | 2011/077753 | 6/2011 |

OTHER PUBLICATIONS

German Office Action dated Jan. 25, 2017 (English translation included).
German Search Report dated Jan. 25, 2017 (English translation included).
German Office Action dated Jan. 27, 2017 (English translation included).
German Search Report dated Jan. 27, 2017 (English translation included).

* cited by examiner

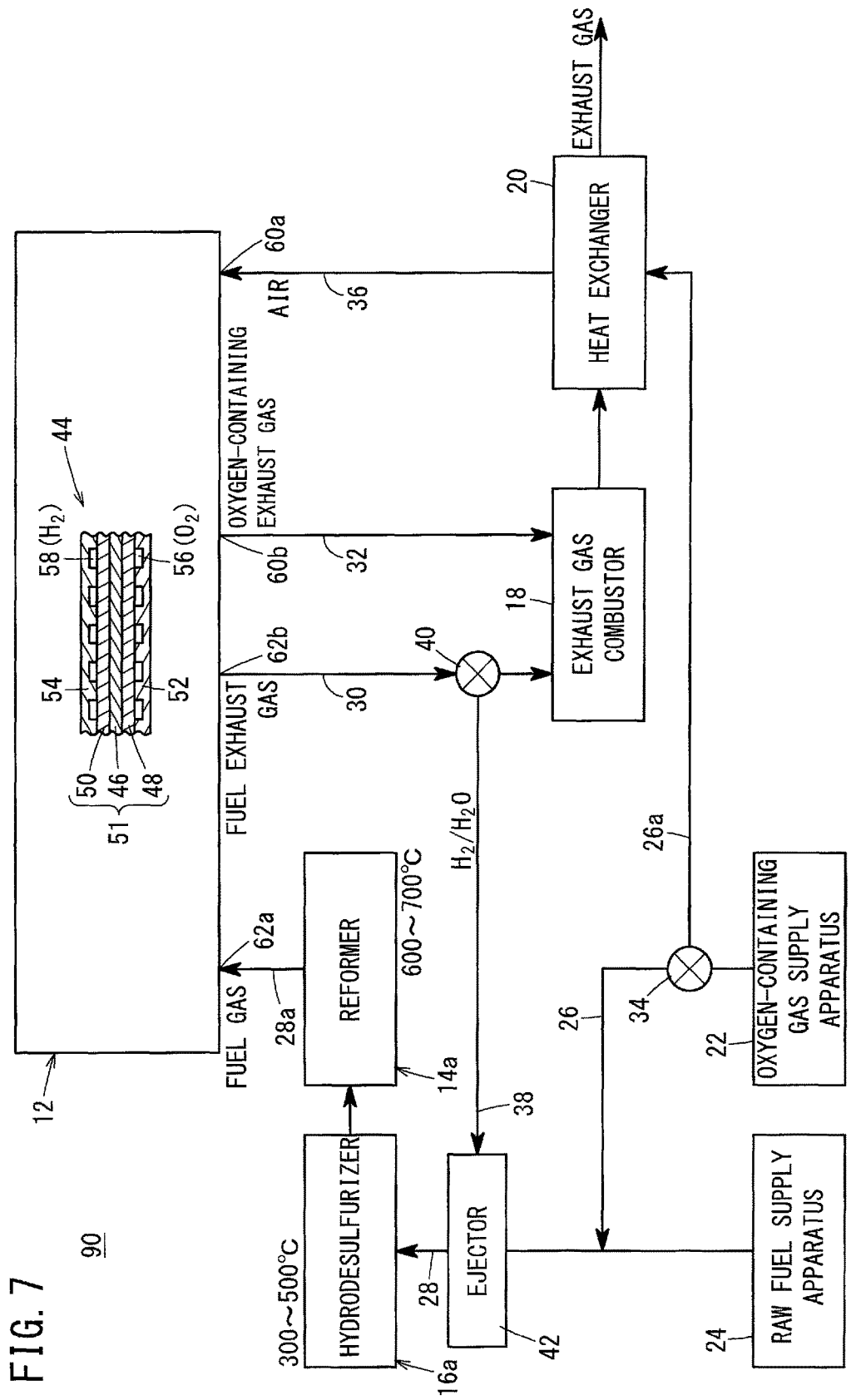

FUEL CELL MODULE

CROSS-REFERENCE TO RELATED APPLICATION

This application is based upon and claims the benefit of priority from Japanese Patent Application No. 2014-175612 filed on Aug. 29, 2014, the contents of which are incorporated herein by reference.

BACKGROUND OF THE INVENTION

Field of the Invention

The present invention relates to a fuel cell module including a fuel cell stack formed by stacking a plurality of fuel cells for generating electrical energy by electrochemical reactions of a fuel gas and an oxygen-containing gas.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (also referred to as MEA). The electrolyte electrode assembly is sandwiched between separators (bipolar plates). In use, generally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer has been used. In general, in the reformer, a reforming raw gas is obtained from a hydrocarbon raw fuel of a fossil fuel or the like, such as methane or LNG, and thereafter, the reforming raw gas undergoes partial oxidation reforming, steam reforming, or autothermal reforming, etc. to produce a reformed gas (fuel gas).

It is desired that this fuel cell is operated relatively at high temperature, and that the fuel cell has the heat insulating properties to improve the heat efficiency. A fuel cell system aimed to address this point has been proposed in Japanese Laid-Open Patent Publication No. 2012-182032. The fuel cell system has simple and compact structure with heat insulating properties while allowing a fuel cell stack to be heated uniformly.

This fuel cell system includes a fuel cell stack including a plurality of stacked fuel cells, a reformer, a heat exchanger, and a fuel cell stack mounting member for mounting the fuel cell stack. Further, the fuel cell system includes a fluid unit equipped with a frame member for holding the reformer, the heat exchanger, and the fuel cell stack mounting member. The fuel cell stack is provided on one side of the fluid unit, and a combustor is provided adjacent to the other side of the fluid unit. The combustor heats the reformer and the heat exchanger by the combustion gas produced in combustion.

Further, a first case member containing the fuel cell stack is connected to the fuel cell stack mounting member, and a second case member containing the first case member and the fluid unit are connected to the frame member.

Further, both ends of a channel member are connected to the fuel cell stack mounting member and the heat exchanger. An off gas which has been partially consumed in the power generation reaction of the fuel cell stack is supplied from an internal space of the first case member to the heat exchanger as a heating medium through the channel member. After heat exchange at the heat exchanger, the off gas discharged from the heat exchanger is discharged through an off gas channel formed between the first case member and the second case member.

As described above, the off gas discharged after partial consumption in the power generation reaction flows into the heat exchanger as a heating medium for heat exchange with an oxygen-containing gas before the oxygen-containing gas is supplied to the fuel cell stack. According to the disclosure, with the structure, the waste heat of the off gas can be collected effectively, and improvement in the heat efficiency is achieved easily. In particular, it becomes possible to utilize the waste heat for directly heating the fuel cells, and effectively utilize the waste heat as a heating energy for heating the oxygen-containing gas by the heat exchanger.

SUMMARY OF THE INVENTION

The present invention has been made in relation to the technique of this type, and an object of the present invention is to provide a fuel cell module having compact structure in which it is possible to suppress radiation of heat from the fuel cell stack as much as possible, and improve the start-up performance and the heat efficiency.

A fuel cell module according to the present invention includes a fuel cell stack, a first casing, an exhaust gas combustor, a heat exchanger, a reformer, and a hydrodesulfurizer. The fuel cell stack includes a plurality of stacked fuel cells configured to generate electrical energy by electrochemical reactions of a fuel gas and an oxygen-containing gas.

The first casing contains the fuel cell stack. The exhaust gas combustor is configured to combust the fuel gas discharged from the fuel cell stack as a fuel exhaust gas and the oxygen-containing gas discharged from the fuel cell stack as an oxygen-containing exhaust gas to produce a combustion gas. The heat exchanger is configured to increase the temperature of the oxygen-containing gas by heat exchange with the combustion gas and supplying the oxygen-containing gas to the fuel cell stack. The reformer is configured to reform a raw fuel chiefly containing hydrocarbon to produce the fuel gas supplied to the fuel cell stack. The hydrodesulfurizer is configured to remove a sulfur component contained in the raw fuel.

The fuel cell module includes a second casing containing at least the first casing, the exhaust gas combustor, and the heat exchanger. The exhaust gas combustor has a combustion gas discharge opening opened to a combustion gas chamber formed between the first casing and the second casing.

In the present invention, the second casing contains at least the first casing (containing the fuel cell stack), the exhaust gas combustor, and the heat exchanger. Further, the exhaust gas combustor has the combustion gas discharge opening opened to the combustion gas chamber formed between the first casing and the second casing. In the structure, the hot combustion gas flows around the first casing, i.e., flows around the fuel cell stack, and can function as a heat insulating layer of the fuel cell stack. Therefore, it becomes possible to suppress heat radiation from the fuel cell stack as much as possible. Thus, the desired start-up performance and the high heat efficiency are achieved.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a diagram schematically showing structure of a fuel cell module according to a second embodiment of the present invention.

DESCRIPTION OF THE PREFERRED EMBODIMENTS

Figure 1:
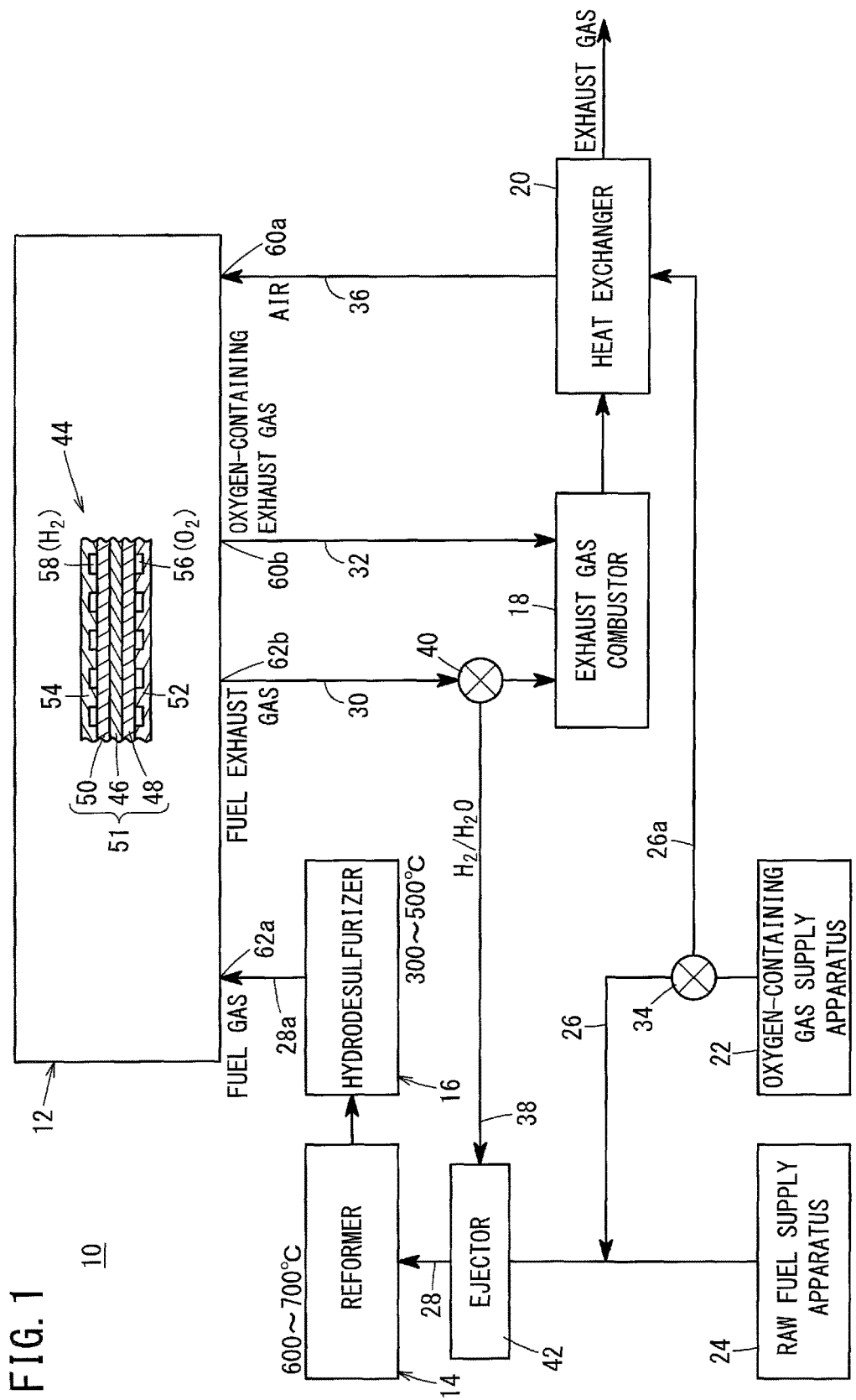
FIG. 1 is a diagram schematically showing structure of a fuel cell module according to a first embodiment of the present invention.

A fuel cell module 10 according to a first embodiment of the present invention shown in FIG. 1 is used in various applications, including stationary, in-vehicle, and mobile applications.

The fuel cell module 10 includes a fuel cell stack 12, a reformer 14, a hydrodesulfurizer 16, an exhaust gas combustor 18, and a heat exchanger 20. An oxygen-containing gas supply apparatus 22 for supplying an oxygen-containing gas and a raw fuel supply apparatus 24 for supplying a raw fuel (e.g., city gas) are connected to the fuel cell module 10.

The oxygen-containing gas supply apparatus 22 is connected to the reformer 14 through an oxygen-containing gas supply channel 26, and the raw fuel supply apparatus 24 is connected to the reformer 14 through a fuel gas supply channel 28. In the illustrated embodiment, the oxygen-containing gas supply channel 26 is connected to a position somewhere in the fuel gas supply channel 28. Alternatively, the oxygen-containing gas supply channel 26 may be connected directly to the reformer 14. The reformer 14 performs partial oxidation reforming or steam reforming of a raw fuel chiefly containing hydrocarbon to produce a fuel gas supplied to the fuel cell stack 12.

The hydrodesulfurizer 16 is provided for the fuel gas supply channel 28 at a position downstream of the reformer 14. The hydrodesulfurizer 16 removes sulfur components contained in the raw fuel. The fuel cell stack 12 is provided downstream of the hydrodesulfurizer 16 through a fuel gas supply channel 28a.

A fuel exhaust gas channel 30 for discharging the fuel gas partially consumed in power generation reaction as a fuel exhaust gas and an oxygen-containing exhaust gas channel 32 for discharging the oxygen-containing gas partially consumed in power generation reaction as an oxygen-containing exhaust gas are connected to the fuel cell stack 12. The fuel exhaust gas channel 30 and the oxygen-containing exhaust gas channel 32 are connected to an inlet side of the exhaust gas combustor 18, and an inlet side of the heat exchanger 20 is connected to an outlet side of the exhaust gas combustor 18.

The oxygen-containing gas (air) is supplied from the oxygen-containing gas supply apparatus 22 to the heat exchanger 20 through an oxygen-containing gas supply channel 26a. The oxygen-containing gas supply channels 26, 26a are merged through a control valve 34 capable of controlling the flow rate of the oxygen-containing gas. After the heat exchanger 20 heats the oxygen-containing gas by heat exchange with a combustion gas, the heat exchanger 20 supplies the heated oxygen-containing gas to the fuel cell stack 12 through an oxygen-containing gas supply channel 36.

A recycling channel 38 is connected to a position somewhere in the fuel exhaust gas channel 30. The recycling channel 38 circulates some of the fuel exhaust gas to return to a position of the fuel gas supply channel 28, the position provided upstream of the reformer 14 and the hydrodesulfurizer 16. A control valve 40 is provided at a diverging section of the recycling channel 38 and the fuel exhaust gas channel 30, for controlling the flow rate of the fuel exhaust gas flowing through the recycling channel 38. An ejector 42 is provided at a merging section of the recycling channel 38 and the fuel gas supply channel 28, for controlling the flow rate of the fuel exhaust gas flowing through the recycling channel 38 by the negative pressure resulting from the supply of the raw fuel to the reformer 14.

The fuel cell stack 12 includes a plurality of solid oxide fuel cells 44 for generating electrical energy by electrochemical reactions of the fuel gas (mixed gas of hydrogen, methane, and carbon monoxide) and the oxygen-containing gas (air). The fuel cells 44 are stacked together in a vertical direction or a horizontal direction. For example, each of the fuel cells 44 includes an electrolyte electrode assembly (MEA) 51. The electrolyte electrode assembly 51 includes a cathode 48, an anode 50, and an electrolyte 46 interposed between the cathode 48 and the anode 50. The electrolyte 46 is an ion oxide conductor made of, e.g., stabilized zirconia.

A cathode side separator 52 and an anode side separator 54 are provided on both sides of the electrolyte electrode assembly 51. The cathode side separator 52 has an oxygen-containing gas flow field 56 for supplying the oxygen-containing gas to the cathode 48, and the anode side separator 54 has a fuel gas flow field 58 for supplying the fuel gas to the anode 50. As the fuel cell 44, various types of conventional SOFCs can be adopted.

The operating temperature of the fuel cell 44 is high, at several hundred ° C. Methane in the fuel gas is reformed at the anode 50 to produce hydrogen and CO, and the hydrogen and CO are supplied to a portion of the electrolyte 46 adjacent to the anode 50.

The fuel cell stack 12 has an oxygen-containing gas supply passage 60a connected to an inlet side of each oxygen-containing gas flow field 56, and an oxygen-containing gas discharge passage 60b is connected to an outlet side of each oxygen-containing gas flow field 56. The oxygen-containing gas supply channel 36 is connected to the oxygen-containing gas supply passage 60a, and the oxygen-containing exhaust gas channel 32 is connected to the oxygen-containing gas discharge passage 60b.

Further, the fuel cell stack 12 has a fuel gas supply passage 62a connected an inlet side of each fuel gas flow field 58, and a fuel gas discharge passage 62b connected to an outlet side of each fuel gas flow field 58. The fuel gas supply channel 28a is connected to the fuel gas supply passage 62a, and the fuel exhaust gas channel 30 is connected to the fuel gas discharge passage 62b.

Basically, the reformer 14 functions as a partial oxidation reformer (PDX) at the time of start-up operation, and functions as an autothermal reformer (AR) at the time of rated operation. In partial oxidation reforming, by partial oxidation reforming reaction of the oxygen-containing gas and the raw fuel chiefly containing hydrocarbon (e.g., city gas), the raw fuel is reformed to produce the fuel gas.

Specifically, the partial oxidation reformer is a preliminary reformer for reforming higher hydrocarbon ($C_{2+}$) such as ethane ($C_2H_6$), propane ($C_3H_8$), and butane ($C_4H_{10}$) in the raw fuel to produce the fuel gas chiefly containing hydrogen and CO by partial oxidation reforming. Partial oxidation reforming is performed at the operating temperature in a range of about 500° C. to 1000° C. The partial oxidation reforming uses at least one catalytic metal selected from Pt (platinum) Rh (rhodium), and Pd (palladium).

In autothermal reforming, partial oxidation reforming and steam reforming are performed in combination. In this steam reforming, the mixed gas of the raw fuel and water vapor is reformed to produce the fuel gas. Steam reforming uses at least one catalytic metal selected from Ru (ruthenium), Ni, (nickel), Pt (platinum), Rh (rhodium), Pd (palladium), Ir (iridium), and Fe (iron). In the reformer 14, at least one catalytic metal selected from Pt (platinum), Rh (rhodium), and Pd (palladium) is used as a single catalyst metal for performing partial oxidation reforming and steam reforming.

The hydrodesulfurizer 16 induces reaction of sulfur compound with hydrogen on catalyst (Ni—Mo based catalyst, Co—Mo based catalyst) to transform them into hydrogen sulfide, and takes the hydrogen sulfide into zinc oxide for removal. For example, the following reaction occurs.

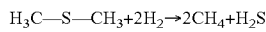

$H_3C—S—CH_3+2H_2 \rightarrow 2CH_4+H_2S$

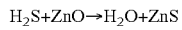

$H_2S+ZnO \rightarrow H_2O+ZnS$

The exhaust gas combustor 18 combusts the fuel gas discharged from the fuel cell stack 12 as the fuel exhaust gas and the oxygen-containing gas discharged from the fuel cell stack as the oxygen-containing exhaust gas to produce the combustion gas, and supplies the combustion gas to the heat exchanger 20. The heat exchanger 20 heats the oxygen-containing gas by heat exchange with the combustion gas, and supplies the oxygen-containing gas to the fuel cell stack 12.

Figure 2:
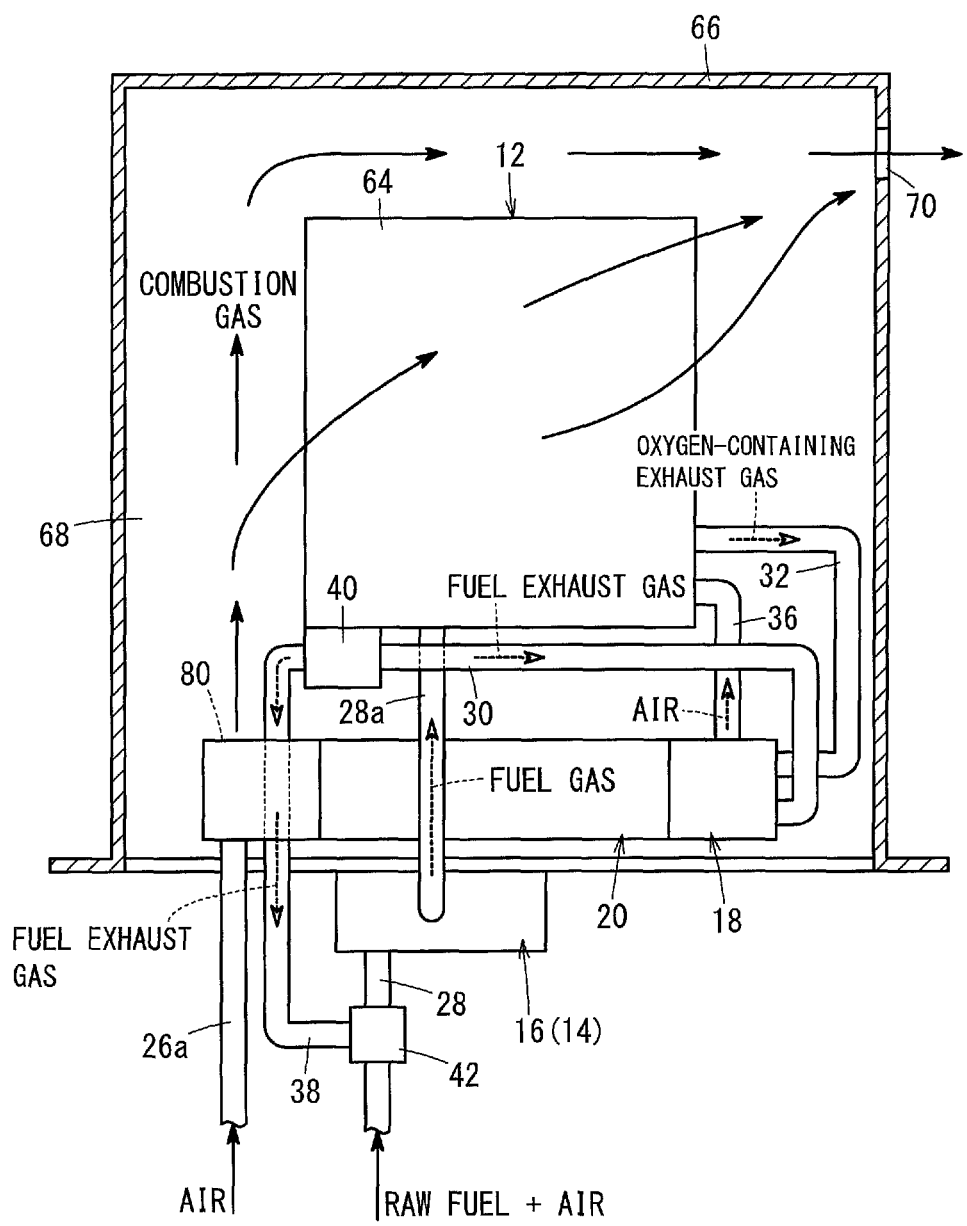
FIG. 2 is a partial cross sectional front view showing the fuel cell module.
Figure 3:
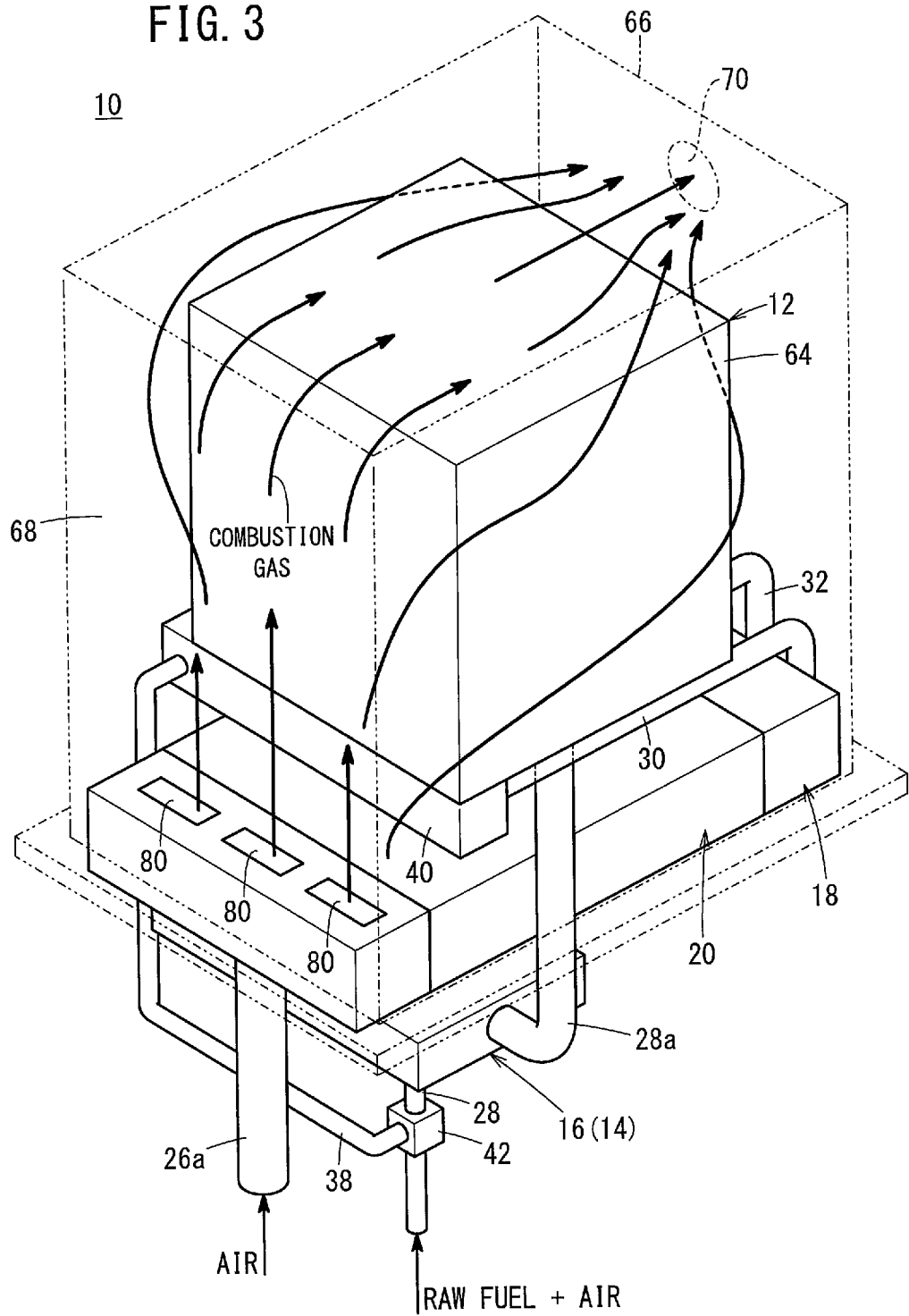
FIG. 3 is a perspective view showing the fuel cell module.

As shown in FIGS. 2 and 3, the fuel cell module 10 includes a first casing 64 containing the fuel cell stack 12 and a second casing 66 containing at least the fuel cell stack 12, the exhaust gas combustor 18 and the heat exchanger 20. A combustion gas chamber 68 is formed between the first casing 64 and the second casing 66.

In the second casing 66, the exhaust gas combustor 18 and the heat exchanger 20 are provided integrally below the fuel cell stack 12, and a combustion gas discharge port 70 is formed at an upper position of the second casing 66 for discharging the combustion gas in the combustion gas chamber 68 to the outside.

Figure 4:
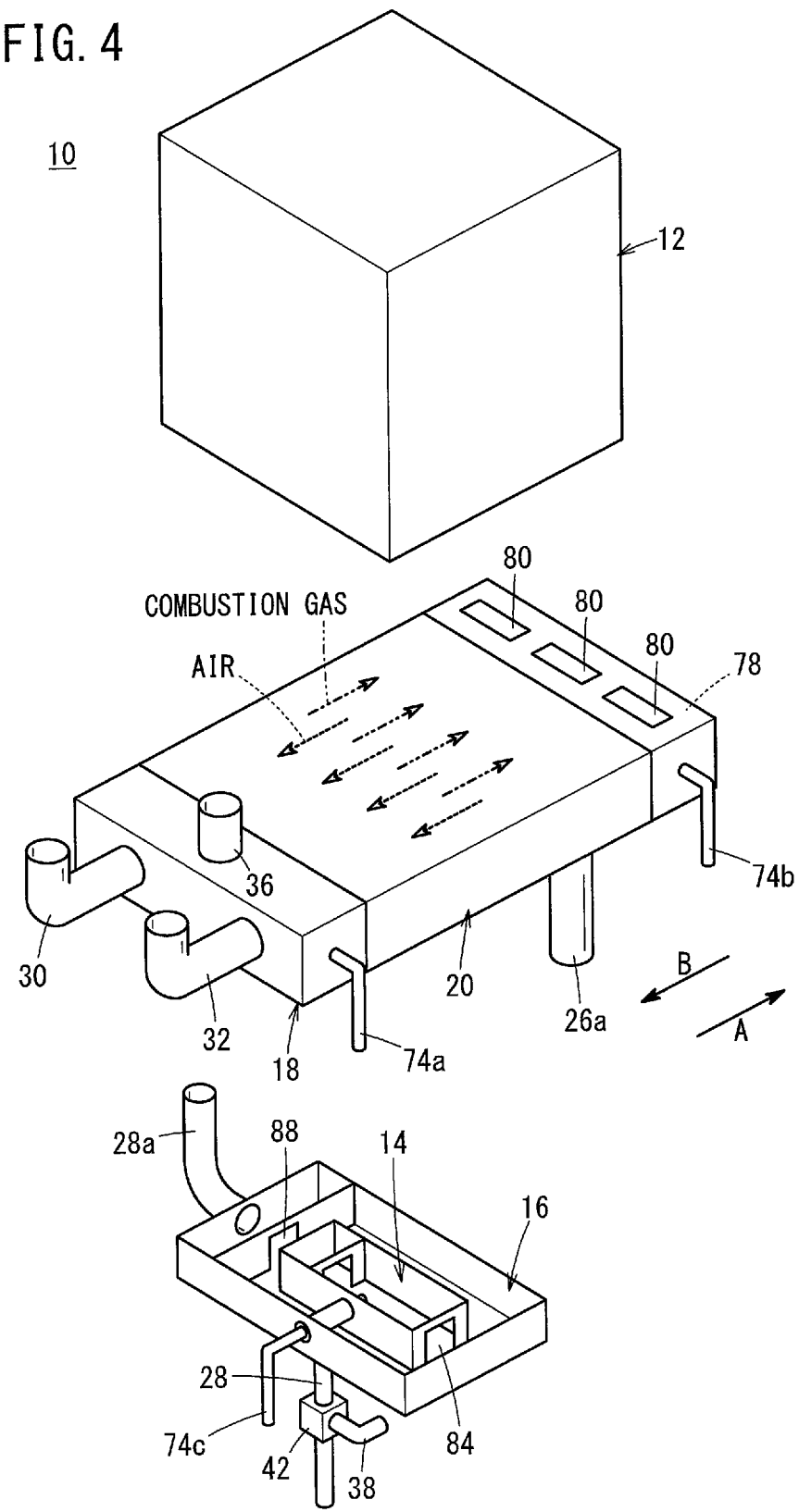
FIG. 4 is an exploded perspective view showing main components of the fuel cell module.
Figure 5:
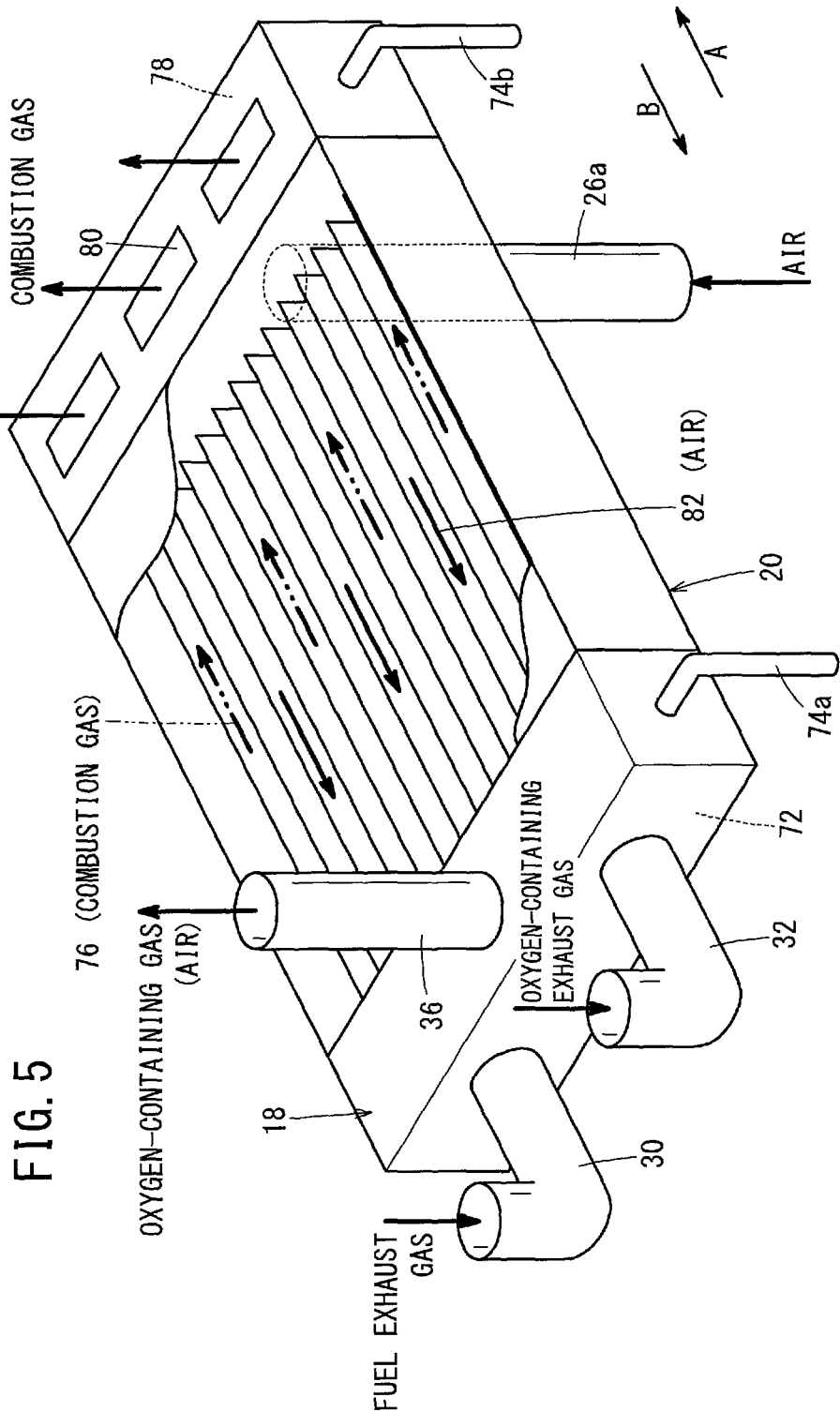
FIG. 5 is a perspective view showing an exhaust gas combustor and a heat exchanger of the fuel cell module.

As shown in FIGS. 4 and 5, the exhaust gas combustor 18 is coupled to an end of the heat exchanger 20. The exhaust gas combustor 18 has a rectangular parallelepiped shape, and has an internal combustion chamber 72. The combustion chamber 72 is connected to the fuel exhaust gas channel 30 and the oxygen-containing exhaust gas channel 32. The oxygen-containing exhaust gas and the fuel exhaust gas are supplied to the combustion chamber 72 for combustion in the combustion chamber 72.

For example, combustion catalyst comprising metal or aluminum supports supporting Pt (platinum), Rh (rhodium), or Pd (palladium) is placed in the combustion chamber 72. An ignition device 74a is provided in the combustion chamber 72, for applying heat from the outside when the exhaust gas temperature does not reach the combustion temperature.

The heat exchanger 20 has a rectangular shape, and includes a plurality of combustion gas flow channels 76. The exhaust gas combustor 18 is connected to one end of the heat exchanger 20. The combustion gas flow channels 76 are connected to the combustion chamber 72 of the exhaust gas combustor 18. The combustion gas flows along each of the combustion gas flow channels 76 in the direction indicated by the arrow A. The combustion gas flow channels 76 are connected to a combustion gas discharge chamber 78.

A plurality of combustion gas discharge openings 80 are formed at upper positions of the combustion gas discharge chamber 78, and the combustion gas discharge openings 80 are opened to the internal space of the combustion gas chamber 68. As shown in FIGS. 2 and 3, in the combustion gas chamber 68, the combustion gas discharge openings 80 and the combustion gas discharge port 70 are provided at diagonal positions. An ignition device 74b is provided in the combustion gas discharge chamber 78, for achieving desired temperature of the combustion gas which is discharged to the combustion gas chamber 68 (see FIGS. 4 and 5).

As shown in FIG. 5, in the heat exchanger 20, a plurality of oxygen-containing gas flow channels 82 are provided for allowing the oxygen-containing gas to flow in a direction indicated by an arrow B (opposite to the direction indicated by the arrow A). The combustion gas flow channels 76 and the oxygen-containing gas flow channels 82 are provided alternately. The ends of the oxygen-containing gas flow channels 82 on the inlet side are connected to the oxygen-containing gas supply channel 26a, and the ends of the oxygen-containing gas flow channels 82 on the outlet side are connected to the oxygen-containing gas supply channel 36.

Figure 6:
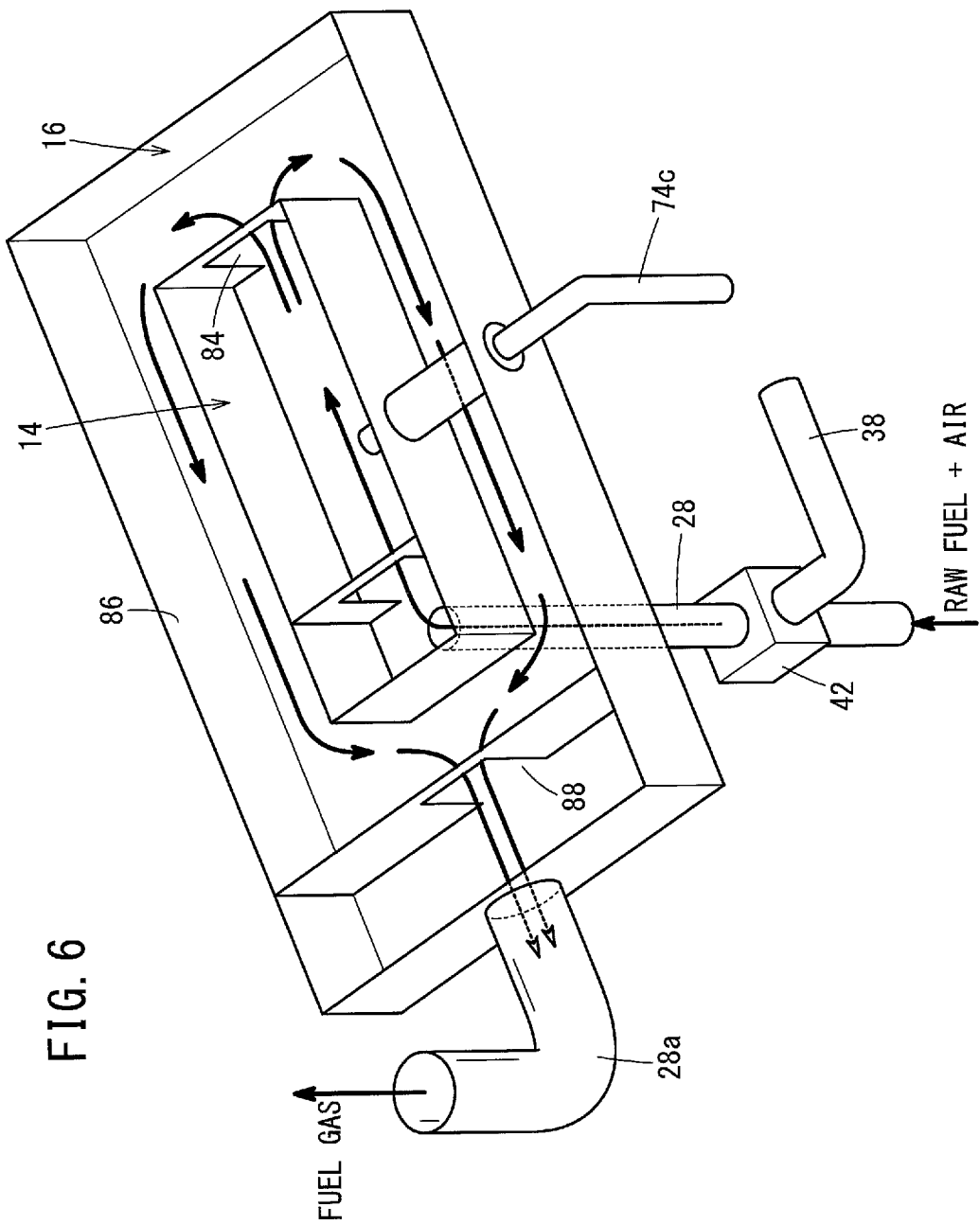
FIG. 6 is a perspective view showing a reformer and a hydrodesulfurizer of the fuel cell module.

As shown in FIGS. 2 and 3, both of the reformer 14 and the hydrodesulfurizer 16 are provided integrally outside the combustion gas chamber 68 at the bottom of the second casing 66. As shown in FIGS. 4 and 6, the reformer 14 is provided inside the hydrodesulfurizer 16. The reformer 14 has a rectangular parallelepiped shape. The fuel gas supply channel 28 is connected to a bottom of the reformer 14 near one end thereof. Catalytic metal (not shown) fills the reformer 14, and an opening 84 is formed on a side portion at the other end of the reformer 14. An ignition device 74c is provided in the reformer 14, for increasing the temperature of the reformer 14.

The opening 84 of the reformer 14 is connected to one internal end of the hydrodesulfurizer 16. The reformer 14 is provided at a substantially central position in the hydrodesulfurizer 16, and a hydrodesulfurization chamber 86 is provided around the reformer 14. Though not shown, catalyst fills the hydrodesulfurization chamber 86. The fuel gas supply channel 28a is connected to the other internal end of the hydrodesulfurizer 16 through an opening 88.

Operation of this fuel cell module 10 will be described below.

At the time of start-up operation of the fuel cell module 10, as shown in FIG. 1, air as the oxygen-containing gas is supplied from the oxygen-containing gas supply apparatus 22 to the oxygen-containing gas supply channels 26, 26a. Some of the air is merged into the fuel gas supply channel 28, and supplied to the reformer 14. The remaining air is supplied to the heat exchanger 20.

In the meanwhile, a raw fuel such as the city gas (containing $CH_4$, $C_2H_6$, $C_3H_8$, $C_4H_{10}$) is supplied from the raw fuel supply apparatus 24 to the fuel gas supply channel 28. The raw fuel is supplied into the reformer 14. Therefore, the mixed gas of the raw fuel and the air is supplied into the reformer 14, and the mixed gas is ignited by the ignition device 74c to start partial oxidation reforming.

For example, if $O_2/C=0.5$, partial oxidation reaction ($2CH_4+O_2 \rightarrow 4H_2+2CO$) is induced. This partial oxidation reaction is exothermic reaction. A reducing gas (fuel gas) at high temperature (about 500° C. to 1000° C.) is produced from the reformer 14. The hot reducing gas is supplied to the hydrodesulfurizer 16. Specifically, as shown in FIG. 6, after the reducing gas flows in the longitudinal direction of the reformer 14, the reducing gas flows through the opening 84 into the hydrodesulfurization chamber 86. Therefore, sulfur compound contained in the reducing gas is transformed into hydrogen sulfide, and then, the hydrogen sulfide is taken into zinc oxide for removal.

After the sulfur compound is removed from the reducing gas, the reducing gas flows through the fuel gas supply channel 28*a*, and the reducing gas is supplied to the fuel gas supply passage 62*a* of the fuel cell stack 12. As shown in FIG. 1, in the fuel cell stack 12, after the hot reducing gas flows through each fuel gas flow field 58, the reducing gas is discharged from the fuel gas discharge passage 62*b* to the fuel exhaust gas channel 30. Some of the reducing gas is diverged into the recycling channel 38, and the remaining reducing gas flows into the exhaust gas combustor 18 connected to the fuel exhaust gas channel 30.

As shown in FIG. 5, as described later, air (oxygen-containing exhaust gas) is supplied to the combustion chamber 72 of the exhaust gas combustor 18, the air and the reducing gas are self-ignited, or ignited by the ignition device 74*a*, and combusted. The combustion gas produced in the combustion chamber 72 flows through the plurality of combustion gas flow channels 76 of the heat exchanger 20, and then, the combustion gas is discharged into the combustion gas discharge chamber 78. Further, the combustion gas flows from the combustion gas discharge openings 80 into the combustion gas chamber 68.

In the heat exchanger 20, the air is supplied from the oxygen-containing gas supply channel 26*a* to the oxygen-containing gas flow channels 82. When the air flows along each of the oxygen-containing gas flow channels 82, the air is heated by heat exchange with the combustion gas. As shown in FIG. 1, the heated air is supplied to the oxygen-containing gas supply passage 60*a* of the fuel cell stack 12 through the oxygen-containing gas supply channel 36, and the fuel gas is discharged to the outside of the fuel cell module 10 as an exhaust gas.

After this air flows through each oxygen-containing gas flow field 56, the air is discharged from the oxygen-containing gas discharge passage 60*b* to the oxygen-containing exhaust gas channel 32. Further, the air flows into the exhaust gas combustor 18, and the air is used for the combustion process. Therefore, by combustion in the exhaust gas combustor 18, the fuel cell stack 12 is heated by the radiated heat or transmitted heat.

In the meanwhile, the fuel exhaust gas diverged into the recycling channel 38 flows into the fuel gas supply channel 28 under the negative pressure operation of the ejector 42, and the fuel exhaust gas is supplied to the reformer 14. The fuel exhaust gas contains hydrogen and water vapor, and the water vapor is sent to the reformer 14 to perform steam reforming. Thus, since the air and the water vapor are supplied to the reformer 14, partial oxidation reforming and steam reforming are performed in the reformer 14, and also the reformer 14 performs autothermal reforming function.

At the time of power generation operation of the fuel cell stack 12, as in the case of the start-up operation of the fuel cell stack 12, the air flows through the oxygen-containing gas flow field 56, and the fuel gas flows through the fuel gas flow field 58. Thus, the air is supplied to the cathode 48 of each fuel cell 44, and the fuel gas is supplied to the anode 50 of each fuel cell 44 to generate electrical energy by chemical reactions.

In the first embodiment, as shown in FIGS. 2 and 3, the fuel cell stack 12 is placed in the first casing 64, and the second casing 66 contains the first casing 64, the exhaust gas combustor 18, and the heat exchanger 20. Further, the exhaust gas combustor 18 has the combustion gas discharge openings 80 opened to the combustion gas chamber 68 formed between the first casing 64 and the second casing 66.

In the structure, the hot combustion gas discharged from the combustion gas discharge openings 80 of the exhaust gas combustor 18 to the combustion gas chamber 68 flows around the first casing 64, i.e., flows around the fuel cell stack 12, and functions as a heat insulating layer of the fuel cell stack 12. Therefore, it becomes possible to suppress heat radiation from the fuel cell stack 12 as much as possible. Thus, the desired start-up performance and the high efficiency are achieved.

Further, the exhaust gas combustor 18 and the heat exchanger 20 are provided below the first casing 64, and the combustion gas discharge port 70 is formed at the upper portion of the second casing 66, for discharging the combustion gas flowing through the combustion gas chamber 68. In this regard, the combustion gas discharge port 70 and the combustion gas discharge openings 80 are provided at diagonal positions across the first casing 64.

In the structure, the combustion gas flows from the lower position of the first casing 64, and flows around the first casing 64. Then, the combustion gas is discharged from the upper position of the second casing 66. Thus, the hot combustion gas flows around the fuel cell stack 12, and functions as the heat insulating layer of the fuel cell stack 12. Therefore, it becomes possible to suppress heat radiation from the fuel cell stack 12 as much as possible. Accordingly, improvement in the start-up performance and the high efficiency is achieved.

Further, the reformer 14 and the hydrodesulfurizer 16 are provided outside, and below the second casing 66. In the structure, the reformer 14 and the hydrodesulfurizer 16 are not exposed to the hot atmosphere in the second casing 66. Accordingly, it is possible to suitably achieve the desired reforming efficiency and desulfurization efficiency.

Further, as shown in FIG. 1, the fuel cell module 10 includes the fuel gas supply channel 28 having the reformer 14 and the hydrodesulfurizer 16, for supplying the fuel gas to the fuel cell stack 12. In this regard, the fuel exhaust gas is discharged from the fuel cell stack 12 into the fuel exhaust gas channel 30, and the recycling channel 38 is connected to the fuel exhaust gas channel 30, for circulating some of the fuel exhaust gas to return to an upstream position of the reformer 14 in the fuel gas supply channel 28.

Accordingly, improvement in the fuel utilization ratio and the power generation efficiency is achieved. Further, the fuel exhaust gas chiefly contains the unconsumed fuel gas and the water vapor. Thus, by circulating the unconsumed fuel gas, in the hydrodesulfurizer 16, it becomes possible to perform hydrodesulfurization. Moreover, by circulating the water vapor, in the reformer 14, it becomes possible to perform autothermal reforming utilizing partial oxidation reforming and steam reforming in combination. Thus, the desired start-up performance of partial oxidation reforming and the high efficiency of steam reforming are achieved.

Further, the ejector 42 is provided at the merging section of the recycling channel 38 and the fuel gas supply channel 28 for controlling the flow rate of the fuel exhaust gas flowing through the recycling channel 38 by the negative pressure resulting from the supply of raw fuel to the reformer 14. Therefore, it becomes possible to adjust recycling of the fuel exhaust gas in correspondence with the amount of electrical energy generated in power generation of the fuel cells 44. Accordingly, improvement of the fuel utilization ratio and improvement of the power generation efficiency are achieved.

Further, the control valve 40 is provided at the diverging section of the recycling channel 38 and the fuel exhaust gas channel 30, for controlling the flow rate of the fuel exhaust gas flowing through the recycling channel 38.

Therefore, it becomes possible to finely adjust recycling of the fuel exhaust gas in correspondence with the amount of electrical energy generated in power generation of the fuel cells 44. Thus, improvement of the fuel utilization ratio and improvement of the power generation efficiency are achieved.

Further, the fuel cell module 10 is a solid oxide fuel cell module. Therefore, the fuel cell module 10 is optimally applicable to high temperature type fuel cells such as SOFC.

FIG. 7 is a diagram schematically showing structure of a fuel cell module 90 according to a second embodiment of the present invention. The constituent elements that are identical to those of the fuel cell module 10 according to the first embodiment are labeled with the same reference numerals and detailed description thereof will be omitted.

The fuel cell module 90 has a reformer 14*a* and a hydrodesulfurizer 16*a*, and the reformer 14*a* is provided for the fuel gas supply channel 28, downstream of the hydrodesulfurizer 16*a*.

In the second embodiment, the same advantages as in the case of the first embodiment are obtained.

While the invention has been particularly shown and described with a reference to preferred embodiments, it will be understood that variations and modifications can be effected thereto by those skilled in the art without departing from the scope of the invention as defined by the appended claims.

What is claimed is:

1. A fuel cell module comprising:
a fuel cell stack including a plurality of stacked fuel cells configured to generate electrical energy by electrochemical reactions of a fuel gas and an oxygen-containing gas;
a first casing containing the fuel cell stack;
an exhaust gas combustor configured to combust the fuel gas discharged from the fuel cell stack as a fuel exhaust gas and the oxygen-containing gas discharged from the fuel cell stack as an oxygen-containing exhaust gas to produce a combustion gas;
a heat exchanger configured to increase a temperature of the oxygen-containing gas by heat exchange with the combustion gas and supplying the oxygen-containing gas to the fuel cell stack;
a reformer configured to reform a raw fuel chiefly containing hydrocarbon to produce the fuel gas supplied to the fuel cell stack; and
a hydrodesulfurizer configured to remove a sulfur component contained in the raw fuel,
wherein the fuel cell module includes a second casing containing at least the first casing, the exhaust gas combustor, and the heat exchanger; and
the exhaust gas combustor has a combustion gas discharge opening opened to a combustion gas chamber formed between the first casing and the second casing.

2. The fuel cell module according to claim 1, wherein the exhaust gas combustor and the heat exchanger are provided below the first casing;
a combustion gas discharge port is formed at an upper position of the second casing and is configured to discharge the combustion gas flowing through the combustion gas chamber; and
the exhaust gas discharge port and the combustion gas discharge opening are provided at diagonal positions across the first casing.

3. The fuel cell module according to claim 1, wherein the reformer and the hydrodesulfurizer are provided outside and below the second casing.

4. The fuel cell module according to claim 1, further comprising a fuel gas supply channel having the reformer and the hydrodesulfurizer and being configured to supply the fuel gas to the fuel cell stack;
wherein the fuel exhaust gas is discharged from the fuel cell stack into a fuel exhaust gas channel, and a recycling channel is connected to the fuel exhaust gas channel and is configured to circulate some of the fuel exhaust gas to return to a position of the fuel gas supply channel, the position provided upstream of the reformer and the hydrodesulfurizer.

5. The fuel cell module according to claim 4, wherein an ejector is provided at a merging section of the recycling channel and the fuel gas supply channel and is configured to control a flow rate of the fuel exhaust gas flowing through the recycling channel by negative pressure resulting from supply of the raw fuel to the reformer or the hydrodesulfurizer.

6. The fuel cell module according to claim 4, wherein a control valve is provided at a diverging section of the recycling channel and the fuel exhaust gas channel and is configured to control a flow rate of the fuel exhaust gas flowing through the recycling channel.

7. The fuel cell module according to claim 1, wherein the fuel cell module is a solid oxide fuel cell module.

* * * * *